United States Patent
Rubin et al.

(10) Patent No.: US 7,281,122 B2
(45) Date of Patent: Oct. 9, 2007

(54) METHOD AND APPARATUS FOR NESTED CONTROL FLOW OF INSTRUCTIONS USING CONTEXT INFORMATION AND INSTRUCTIONS HAVING EXTRA BITS

(75) Inventors: Norman Rubin, Cambridge, MA (US); Andrew Gruber, Arlington, MA (US)

(73) Assignee: ATI Technologies Inc., Markham, Ontario (CA)

( * ) Notice: Subject to any disclaimer, the term of this patent is extended or adjusted under 35 U.S.C. 154(b) by 324 days.

(21) Appl. No.: 10/756,853

(22) Filed: Jan. 14, 2004

(65) Prior Publication Data

US 2005/0154864 A1 Jul. 14, 2005

(51) Int. Cl.
*G06F 11/10* (2006.01)
(52) U.S. Cl. .............. 712/226; 712/235; 712/233; 712/234
(58) Field of Classification Search ............ 712/226, 712/235, 233, 234
See application file for complete search history.

(56) References Cited

U.S. PATENT DOCUMENTS

| | | | | |
|---|---|---|---|---|
| 5,673,407 A | * | 9/1997 | Poland et al. | 712/222 |
| 5,692,168 A | * | 11/1997 | McMahan | 712/237 |
| 6,061,786 A | * | 5/2000 | Witt | 712/237 |
| 6,321,302 B1 | * | 11/2001 | Strongin et al. | 711/138 |
| 6,717,576 B1 | * | 4/2004 | Duluk et al. | 345/419 |

OTHER PUBLICATIONS

T. Blank, The MasPar MP-1 Architecture Proceeding of Compcon, Spring 90, The 35th IEEE Computer Society International Conference, San Franciso, CA, Feb. 1990, pp. 20-23.
Keryell, Ronan and Paris, Nicolas, Activity Counter: New Optimization for the Dynamic Scheduling of SIMD Control Flow, Jan. 1993, pp. 1-16.

* cited by examiner

*Primary Examiner*—Donald Sparks
*Assistant Examiner*—Vincent Lai
(74) *Attorney, Agent, or Firm*—Vedder, Price, Kaufman & Kammholz, P.C.

(57) ABSTRACT

A method and apparatus for nested control flow includes a processor having at least one context bit. The processor includes a plurality of arithmetic logic units for performing single instruction multiple data (SIMD) operations. The method and apparatus further includes a first memory device storing a plurality of instructions wherein each of the plurality of instructions includes a plurality of extra bits. The processor is operative to execute the instructions based on the extra bits and in conjunction with a context bit. The method and apparatus further includes a second memory device, such as a general purpose register operably coupled to the processor, the second memory device receiving an incrementing counter instruction upon the execution of one of the plurality of instructions. As such, the method and apparatus allows for nested control flow through a single context bit in conjunction with instructions having a plurality of extra bits.

20 Claims, 3 Drawing Sheets

METHOD AND APPARATUS FOR NESTED CONTROL FLOW OF INSTRUCTIONS USING CONTEXT INFORMATION AND INSTRUCTIONS HAVING EXTRA BITS

FIELD OF THE INVENTION

The present invention relates generally to arithmetic operations and more specifically to parallel processing on single instruction multiple data stream computations.

BACKGROUND OF THE INVENTION

In single instruction multiple data (SIMD) parallel processing models, systems are designed to perform the same computation on many sets of data in parallel. Because SIMD processors have impressive cost to performance ratios, they are typically well suited to graphics processing. A typical SIMD processor consists of a single control unit and a set of processing elements where each element is a fully functional arithmetic logic unit capable of executing instructions. The processing element contains local data stored either on local memory or local registers and the control unit determines the instructions for all processing elements. Each processing element, therefore applies an identical computation to a different set of data.

While many graphics problems can be formulated as identical data computations over large sets of data, some computations require different operations and therefore need to support various levels of control flow. Due to the basic operations of SIMD processors, nested control flow may be problematic. A solution for supporting a single level of conditional control flow includes adding a predicate condition, also referred to as a context bit, for each processing element. When the processing element attempts to write a value, it initially checks the context bit and then does not write the element when the context bit is in an off state. A single predicate bit per processing element is an inexpensive implementation in hardware but is limited in only providing a single level of conditional nesting.

Another option to handle nested conditional flow is utilizing a separate control processor to modify the context bit. Although, utilizing a separate control processor is expensive with the requirement of extra processing elements and can slowdown processing speeds. Although, this approach utilizing separate control processors may be utilized in a super computer it is not a feasible solution in a standard processing system.

Another option is utilizing a stack of bits per processing element in lieu of the single context bit. In one approach, a specialized stack per processing element may add significant cost to the device and the stack itself requires additional instructions to manipulate the stack. Among other things, a push command, a pop command and possibly other instructions that modify the stack are internally required.

As the values on the stack correspond to the processing element being on or off, the values on the stack are not independent. Therefore, either the entire stack contains on values or the bottom of the stack contains on values and the top of the stack contains any arbitrary number of off values. Therefore, another approach is to replace each of the stacks (one stack per processing element) by a set of counters (one counter per processing element). The value in each counter would indicate the number of off settings on the stack relative to a transition stage, such as going from an on to an off value. This approach is beneficial as the use of a set of counters requires less hardware. N bit counter can hold the same information as a $2^N$ bit stack. As the amount of hardware required decreases, this approach still has several limitations. Among other things, certain constructs require a compiler to compute additional information, such as to break from a nested loop requires knowing the exact number of control flow constructs that need to be exited by the break. Furthermore, when the amount of hardware has decreased, an additional counter is needed for each processing element. If the element is pipelined, a counter is required for each pipeline stage in the processing element. Therefore, since many graphics program do not require control flow, this additional hardware adds significant costs without always improving performance.

As such, there exists a need for allowing SIMD parallel processing in a graphics application for performing data computations over large sets of data with nested control flow.

DETAILED DESCRIPTION OF A PREFERRED EMBODIMENT

Generally, the present invention includes a method and apparatus for nested control flow including a processor having a context bit. The processor may be, but not limited to, a single processor, plurality of processors, a DSP, a microprocessor, ASIC, state machine, or any other implementation capable of processing and executing software. The term processor should not be construed to refer exclusively to hardware capable of executing software, and may implicitly include DSP hardware, ROM for storing software, RAM, and any other volatile or non-volatile storage medium. The context bit may be a singular binary bit, such as a zero or one value.

The method and apparatus further includes a first memory device storing a plurality of instructions wherein each of the plurality of instructions includes a plurality of extra bits, the processor operative to execute the plurality of instructions. The memory device may be, but not limited to, a single memory, a plurality of memory locations, shared memory CD, DVD, ROM, RAM, EEPROM, optical storage, microcode or amy other non-volatile storage capable of storing digital data for use by the processor. Moreover, the plurality of instructions may be any suitable coded instructions encoded within any suitable programming language or other instructional operation.

The method and apparatus for nested control flow further includes a second memory device operably coupled to the processor, the memory device receives and increments a counter value upon the execution of one of the plurality of instructions. The method and apparatus, by the inclusion of the plurality of extra bits in conjunction with the context bit, provide for an improved nested control flow operation through the determination of whether to execute an instruction based not only on the plurality of extra bits, but also the value of the context bit itself.

Figure 1:
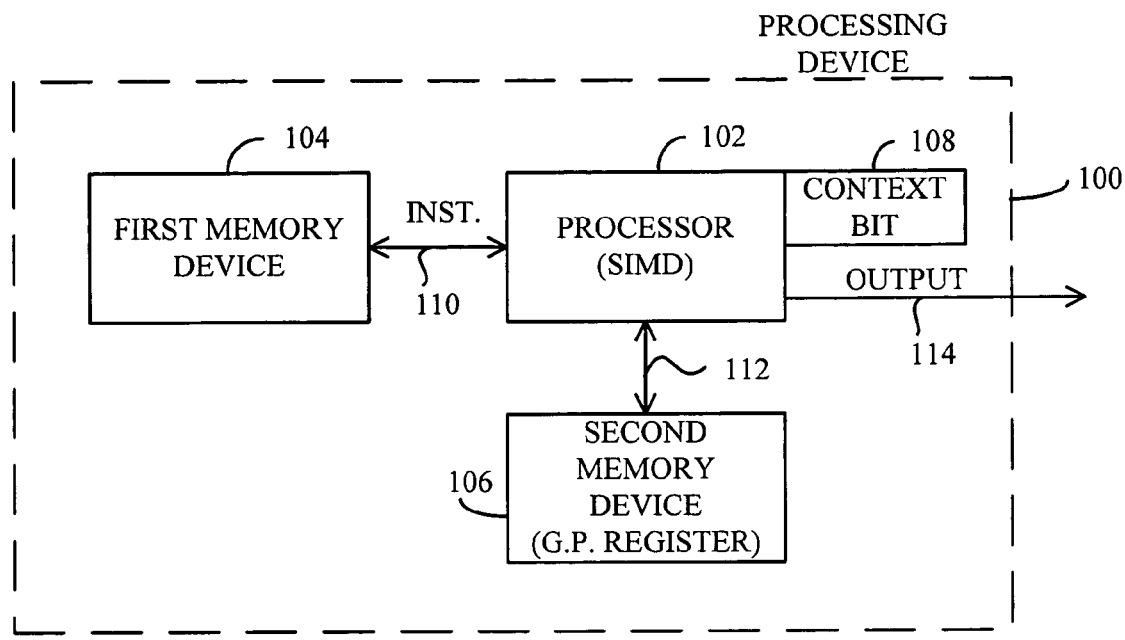
FIG. 1 illustrates a schematic block diagram of an apparatus for nested control flow in accordance with one embodiment of the present invention.

More specifically, FIG. 1 illustrates a processing device 100 having a processor 102, a first memory device 104 and a second memory device 106. In one embodiment, the processing device 100 may be a shader disposed within a pixel processing pipeline in a graphics processing system. The processor 102 includes a context bit 108 which is stored within a context bit memory location associated with the processor 102. Although, as recognized by one having ordinary skill in the art, the context bit 108 may be stored in any suitable location for access by the processor 102. Furthermore, second memory device 106 may be a non-dedicated memory device for use with the processor 102, such as but not limited to, a general purpose register.

In accordance with one embodiment of the present invention, the first memory device 104 provides an instruction 110 to the processor 102. In response to the instruction 110, the processor 102 seeks to implement a single instruction operation on multiple data streams. Not illustrated in FIG. 1, the processor 102 further receives the multiple data streams for the performance of the single operation 110. In accordance with one embodiment of the present invention, the instruction 110 includes a plurality of extra bits. In the preferred embodiment, the extra bits include two extra bits, but as recognized by one having ordinary skill in the art, any suitable number of extra bits may be utilized to provide for the below-described functionality.

Upon receipt of the instruction 110, the processor 102 performs the initial operation of determining whether to read the context bit 108 based on the extra bits within the instruction 110. In one embodiment, the first bit is a conditional yes or no bit and the second bit may be a true or false context check bit. Therefore, based on the extra bits within the instruction, if it is determined to examine the context bit 108, the context bit is read. The context bit 108, in one embodiment, indicates either an on or off position. If the context bit 108 is on, the processor 102 therefore executes the instruction on the data set and provides a maintaining counter instruction 112 to a counter (not illustrated) stored within the second memory device 106. In one embodiment, the counter stored within the second memory device 106 may be a simple integer based counter. The counter provides for the number of operations for determining a nested control flow upon receiving another instruction 110, wherein the counter value indicates a nesting depth of context bits that are set to a second state. The processor 102 maintains the counter within the second memory device 106. Therefore, the counter allows for tracking the number of executed operations.

When the processor 102 has executed all the instructions 110 or is determined to exit a nested control flow, the processor 102 thereupon generates an output signal 114 which is provided in one embodiment to the next step in the pixel processing pipeline. In one embodiment, the processing device 100 may be a shader such that the output is a plurality of shaded vertices.

Figure 2:
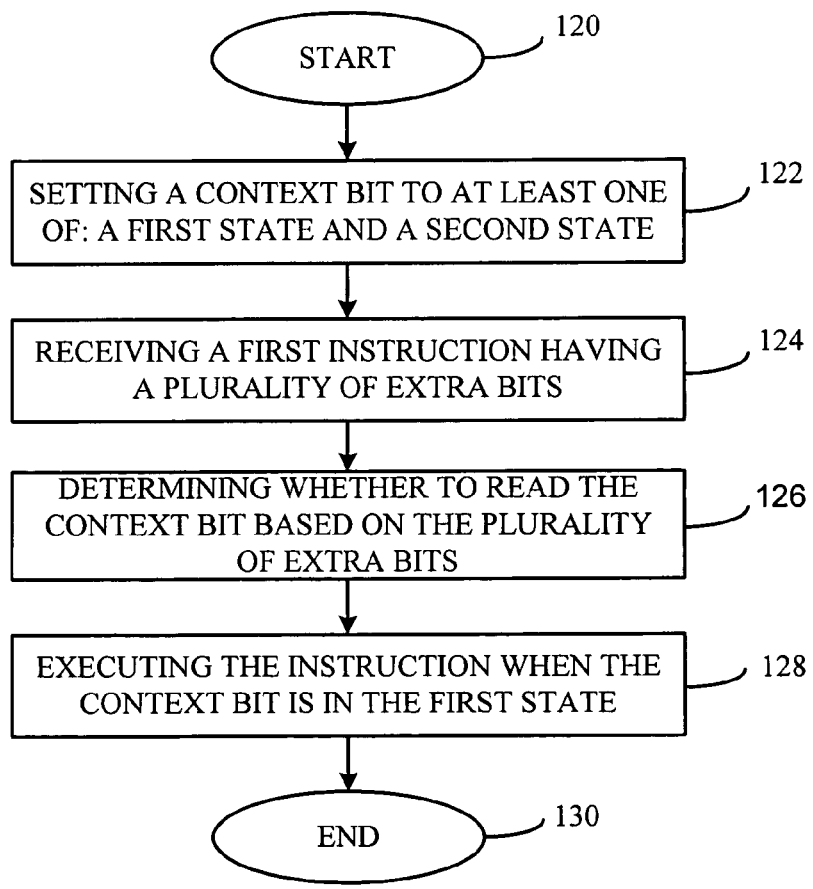
FIG. 2 illustrates a flow chart of a method for nested control flow in accordance with one embodiment of this present invention.

FIG. 2 illustrates one embodiment of a flow chart of a method for nested control flow. The method begins, step 120, by setting a context bit to either a first state or a second state, step 122. In one embodiment, the first state may be an on state and the second state may be an off state. Step 124 is receiving a first instruction having a plurality of extra bits. As discussed above, with respect to FIG. 1, the first instruction 110 may be received from the memory device 104, wherein the instruction 110 includes the plurality of extra bits.

Step 126 is determining whether to read the context bit based on the plurality of extra bits. This step is performed, in one embodiment, by the processor 102 based on examining the status of the extra bits, such as a true or false state or a yes or no state. Furthermore, if the context bit 108 is read, the context bit is extracted from the memory location storing the context bit 108 such that the processor 102 may read the context bit 108. Step 128 is executing the instruction when the context bit is in the first state, upon the reading of the context bit. As discussed above, the instruction is performed by the processor 102 which is a SIMD processor processing the single instruction upon multiple data sets. Thereupon, the method is complete, step 130.

Figure 3:
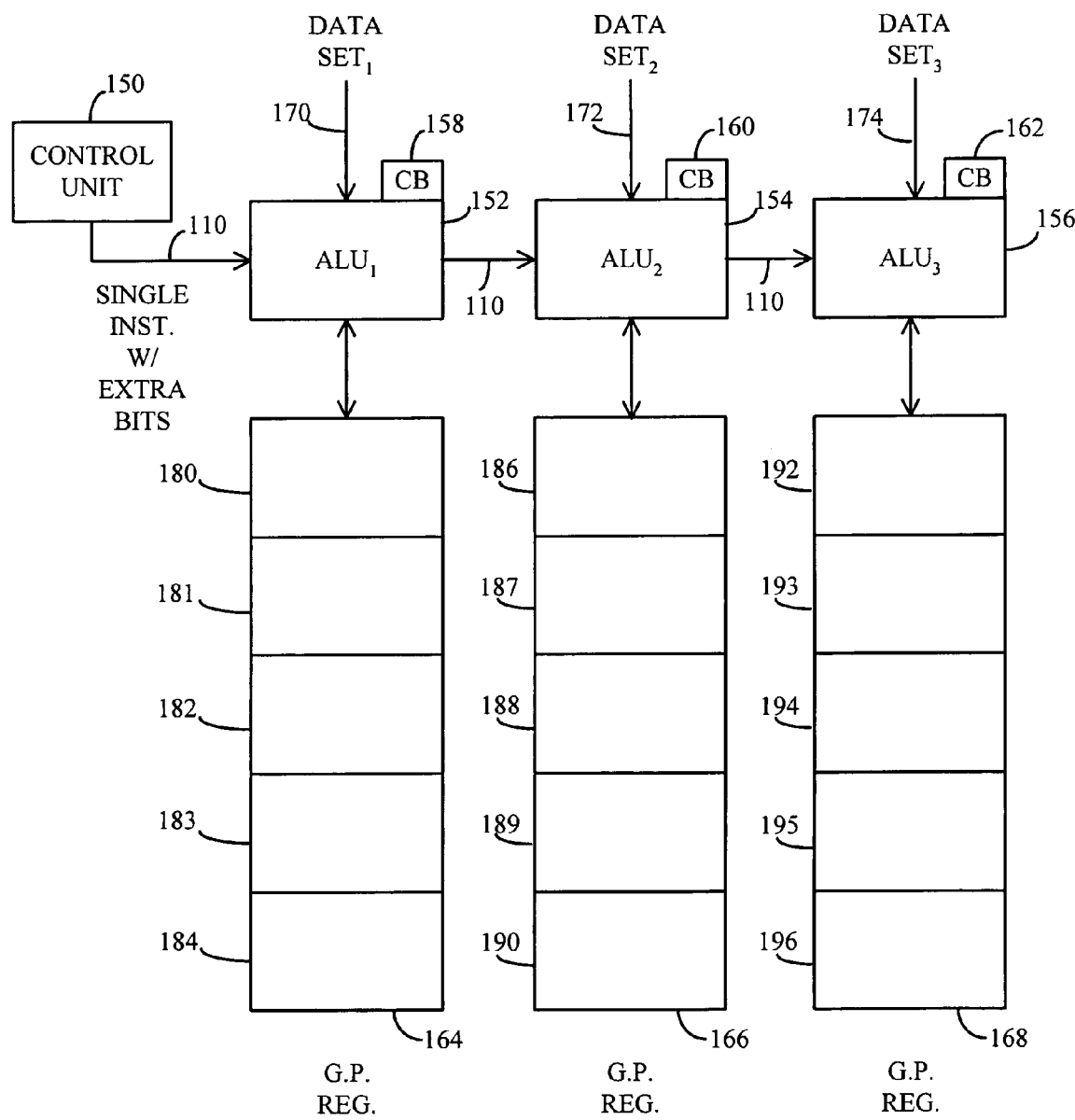
FIG. 3 illustrates a block diagram of an alternative embodiment of the graphics processing device allowing for a nested control flow in accordance with one embodiment of the present invention.

FIG. 3 illustrates a further graphical representation of the apparatus for nested control flow including a control unit 150, a first ALU 152, a second ALU 154 and a third ALU 156, wherein each ALU includes a context bit 158, 160 and 162 respectively. Furthermore, the ALUs 152, 154 and 156 are coupled to general purpose registers 164, 166 and 168 respectively. As recognized by one having ordinary skill in the art, the general purpose registers 164, 166 and 168 may be any suitable non-dedicated memory which is accessible by the ALUs 152, 154 and 156. The ALUs 152, 154 and 156 receive a single instruction with extra bits 110 from the control unit 150. The first ALU 152 receives a first data set 170, the second ALU 154 receives a second data set 172 and the third ALU 156 receives a third data set 174.

FIG. 3 illustrates three representative ALUs 152, 154 and 156, as recognized by one having ordinary skill in the art in a SIMD processing system, any suitable number of ALUs may be implemented to be operably coupled to receive the single instruction with extra bits 110 and further coupled to general purpose registers, such as 164, 166 and 168, for the storage of computation information therein. Moreover, further ALUs within the system would include the context bit, such as 158, 160 or 162. It should be noted that the three ALUs are for illustrative purposes and not to be meant as so limiting herein.

The present invention utilizes a single context bit per processing element 152, 154 and 156. With the addition of two added bits to each instruction, an instruction can execute independent of the context bit 158, 160 and 162 or can check the context bit 158, 160 and 162 and execute only when the context bit 158, 160 and 162 is set to execute, such as an on position. The present invention eliminates the need for a per element counter by using a general purpose register to hold the counter, such as illustrated as the second memory device 106 of FIG. 1. Consequently, any ALU 152, 154 or 156 operations can be used to modify the counter. The general purpose register used for the counter can be non-dedicated and the same register does not need to be utilized for different kinds of execution of an overall program.

Although, in one embodiment to the present invention, five additional instructions are added to support common conditional flow sequences as noted in the following table:

| Instruction | Action |
| --- | --- |
| Rout = Push cond, Rin | If cond and Rin == 0 then Rout = 0 |
| Rout = Invert Rin | If Rin == 1 then Rout = 0 |

| Instruction | Action |
|---|---|
| Rout = Pop Rin | Rout = Rin − 1 |
| | If Rout <= 0 then |
| Rout = Clear | Rout = large number |
| | Set Pred bit to skip |

As recognized by one having ordinary skill in the art, these control flow sequences can be implemented using any combination of instruction from standard arithmetic operations. Using an exemplary program to illustrate operation of the present invention, an example if-then statement is the operation of:

If x is greater than 0 then
Y=3
Y=u+v

With respect to FIG. 3, representative storage locations within the general purpose registers 164, 166 and 168 have been designated as memory locations 180-184, 186-190 and 192-196 respectively. Based on the operation of the ALU 152, 154 and 156, specific data is written within the general purpose register memory locations 180-184, 186-190 and 192-196. A first operation is the register performing a predicate_push operation to determine if a value stored at Rx is greater than zero, such as looking at an initial value stored within a register for x and performing a predicate_push for register location 180, 186 and 192. Based on this comparison, a second register value may be computed as three (p) relative to register locations 181, 187 and 193. Thereupon, the computation of y=u+v may be performed by the defining of the register value Ry as being the equivalent of the register value Ru in summation with the register value Rv (p). Therefore, register value 180, 186 and 192 would then be defined as a predicate_pop for the value within register locations 180, 186 and 192.

As recognized by one having ordinary skill in the art, the above example indicates one single nested operation within a control flow, wherein the present invention is utilized within multiple nested control flow operations. Therefore, in a nested control flow operation with multiple nested operations, the counter is implemented such that the number of nested operations into the depth of nested control flow may be effectively monitored and controlled when executing any nested flow operation. More specifically, this allows for a machine level instruction set for breaking out of an instruction and jumping around.

As discussed above, there exists any suitable implementation of conditional statements, although two common statements are an if-then statement or a while statement. Included below in Table 2 are two representative examples of the implementation of operations wherein the sequences can be nested; other common control flow sequences can be implemented as well.

| Source sequence | Implementation |
|---|---|
| If cond then | Rstk = Pred_push cond, Rstk |
|     Statement 1 | Statement1 (p) |
| Else | Rstk = Prev_stack_invert Rstk |
|     Statement 2 | Statement2 (p) |
| Endif | Rstk = Pred_pop Rstk |
| While (cond) | Rsave = Rstk |
|     Statement 1 | loop |
|     Break | Rstk = Push cond, Rstk |
|     Statement 2 | Statement 1 (p) |
| Endwhile | Rstk = clear |
| | Statement 2 (p) |
| | Endloop |
| | Rstk = restore Rsave |

Figure 4:
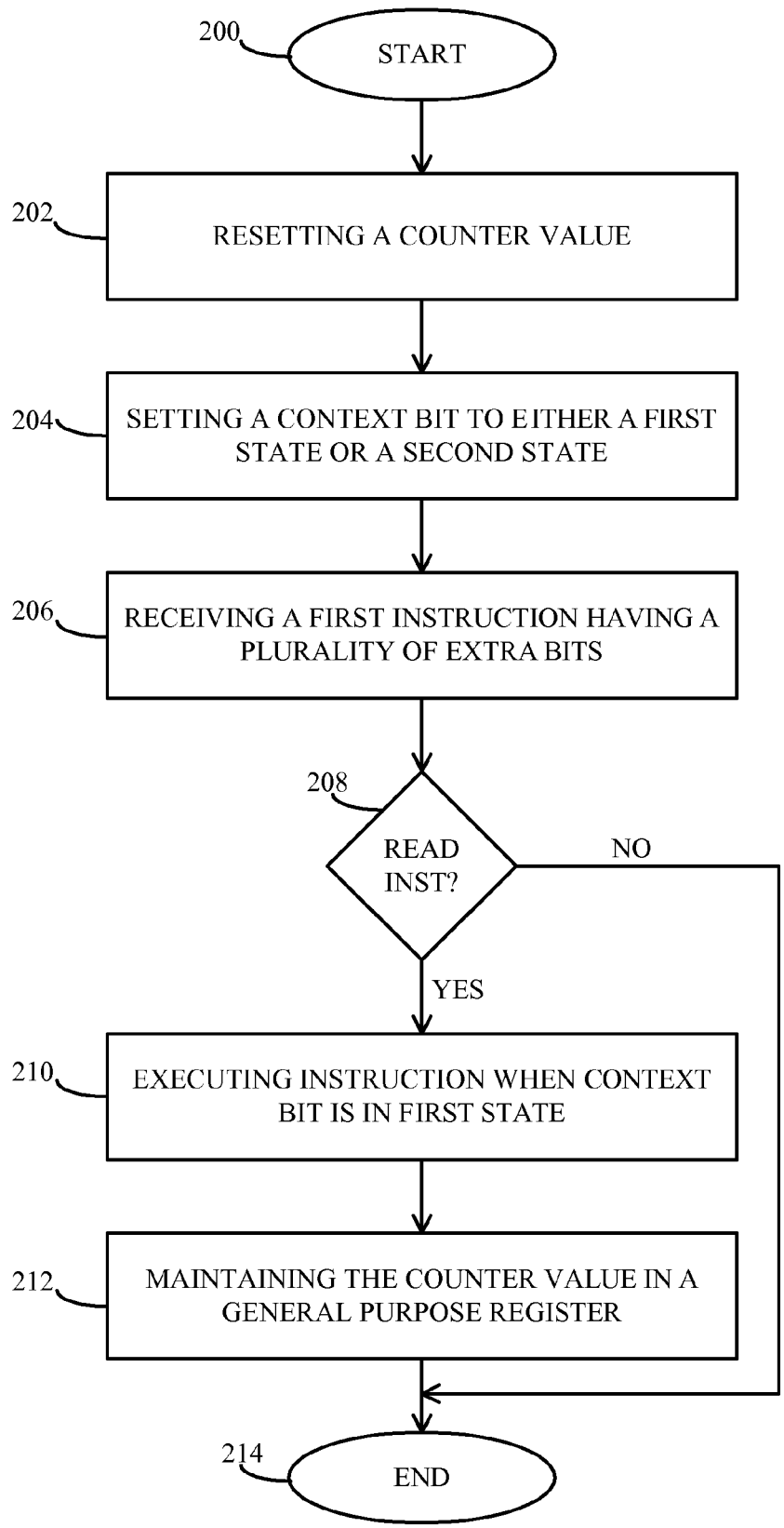
FIG. 4 illustrates a flow chart of another method for nested control flow in accordance with another embodiment of the present invention.

FIG. 4 illustrates a flow chart of another embodiment of a method for nested control flow. The method begins 200, in one embodiment with the step of resetting a counter value step 202. In one embodiment, the counter value may be stored in a general purpose register for indicating an increment of nested control flow operations. Step 204 is setting a context bit to either a first state or second state. The context bit is associated with the particular arithmetic logic unit, such as ALU 152 of FIG. 3 and is set to either an on or off state or may be set to an execute or off state.

Step 206 is receiving a first instruction having a plurality of extra bits. As discussed above, the single instruction with extra bits 110 may be provided from a control unit 150 to all of the ALUs within a SIMD processor. The extra bits allow for a determination of whether the context bit should be read. Step 208 is determining whether to read the context bit based on the plurality of extra bits. This may be operated in accordance with the operation described above. If the determination is yes, step 210 is executing instructions when the context bit is in a first state, such as an execute state. The single instructions with extra bits 110 are executed in parallel by the various ALUs on various data sets, 170, 172 and 174. Step 212 is maintaining the counter value wherein the counter value indicates a nesting depth of context bits that are set to a second state in a general purpose register to indicate that a calculation has been performed.

In the event that the determination of step 208 is in the negative, the method is complete, step 214. The method is also complete upon the performance of step 212.

As such, the present invention provides for an improved nested control flow through the operation of an instruction set having extra bits for the specialized instructions. Moreover, the present invention utilizes general purpose registers and does not require any excess memory locations within the processors. As such, through utilizing special instructions, the present invention improves over the prior art through utilizing less memory resources and allows for nested control flow and jumping around various loops of instructions in a SIMD environment.

It should be understood that the implementation of other variations and modifications of the invention in its various aspects will be apparent to those of ordinary skill in the art, and that the invention is not limited by the specific embodiments described herein. For example, the general purpose register may be any suitable non-dedicated memory device operative to provide data storage and communication with the arithmetic logic units. It is therefore contemplated and covered by the present invention any and all modifications, variations or equivalents that fall within the spirit and scope of the basic underlying principles disclosed and claimed herein.

What is claimed is:

1. A method for nested control flow, the method comprising:

setting a context bit to at least one of: a first state and a second state;

receiving a first instruction having a plurality of extra bits;

reading the context bit based on the plurality of extra bits, wherein the context bit is independent of the first instruction having a plurality of extra bits; and executing the instruction when the context bit is in the first state.

2. The method of claim 1 further comprising:

maintaining a counter value wherein the counter value indicates a nesting depth of context bits that are set to a second state.

3. The method of claim 2 wherein the counter value is stored in a non-dedicated memory device.

4. The method of claim 3 wherein the non-dedicated memory device is a general purpose register.

5. The method of claim 2 further comprising:

prior to setting the context bits, resetting the counter value.

6. The method of claim 2 further comprising:

receiving a second instruction having a plurality of extra bits;

reading the context bit based on the plurality of extra bits;

executing the second instruction when the context bit is in the first state; and maintaining the counter value.

7. The method of claim 6 further comprising:

exiting a nested control flow using the counter value.

8. An apparatus for nested control flow, the apparatus comprising:

a processor having a context bit memory device capable of storing a context bit;

a first memory device storing a plurality of instructions, wherein of the plurality of instructions includes a plurality of extra bits, wherein the context bit is independent of the plurality of instructions including a plurality of extra bits, and wherein the processor is operative to execute the plurality of instructions; and a second memory device operably coupled to the processor, and wherein the second memory device receives an incrementing counter instruction upon the execution of one of the plurality of instructions.

9. The apparatus of claim 8 wherein the second memory device is a general purpose register.

10. The apparatus of claim 8 wherein the processor:

receives a first instruction having a plurality of extra bits from the first memory device; and reads the context bit based on the plurality or extra bits.

11. The apparatus of claim 10 wherein the processor:

executes the first instruction when the context bit is read and is in a first state; and maintains a counter value wherein the counter value indicates a nesting depth of context bits that are set to a second state, using the incrementing counter instruction.

12. The apparatus of claim 11 wherein the processor:

receives a second instruction having a plurality of extra bits from the first memory device;

reads the context bit based on the plurality of extra bits;

executes the second instruction when the context bit is in a first state; and increments the counter value using the incrementing counter instruction.

13. A graphics processing device comprising:

a plurality of arithmetic logic units, each of the plurality arithmetic logic units having a context bit memory device capable of storing a context bit;

a first memory device storing a plurality of instructions, wherein each of the plurality of instructions includes a plurality of extra bits, wherein the context bit is independent of the plurality of instructions including a plurality of extra bits, and wherein the arithmetic logic units are operative to execute the plurality of instructions; and a second memory device operably coupled to the processor, wherein the second memory device receives an incrementing counter instruction upon the execution of one of the plurality of instructions.

14. The graphics processing device of claim 13 wherein the second memory device is a general purpose register.

15. The graphics processing device of claim 13 wherein each of the plurality of arithmetic logic units;

receive at least one of the plurality of instructions; and reads the context bit based on the plurality of extra bits.

16. The graphics processing device of claim 15 wherein the plurality of arithmetic logic units;

execute the instructions when the context bit is read and is in a first state; and maintains a counter value wherein the counter value indicates a nesting depth of context bits that are set to a second state, using the incrementing counter instruction.

17. The graphics processing device of claim 16 wherein the plurality of arithmetic logic units are operative to exit a nested control flow using the context bit stored in the second memory device.

18. A method for nested control flow, the method comprising:

setting a context bit to at least one of: a first state and a second state;

receiving a first instruction having a plurality of extra bits;

reading the context bit based on the plurality of extra bits, wherein the context bit is independent of the first instruction having a plurality of extra bits;

executing the first instruction when the context bit is in the first state; and upon the executing of the first instruction, maintaining a counter value wherein the counter value indicates a nesting depth of context bits that are set to a second state in a general purpose register.

19. The method of claim 18 further comprising:

receiving a second instruction having a plurality of extra bits;

reading the context bit based on the plurality of extra bits;

executing the second instruction when the context bit is in the first state; and incrementing the counter value.

20. The method of claim 19 further comprising:

exiting a nested control flow using the counter value.

* * * * *